United States Patent
Aoki (10) Patent No.: US 7,788,179 B2
(45) Date of Patent: Aug. 31, 2010

(54) PRINTING SYSTEM USING A PORTABLE TERMINAL AND PRINTING CHARGE COLLECTING METHOD

(75) Inventor: Satoshi Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 2529 days.

(21) Appl. No.: 09/953,297

(22) Filed: Sep. 17, 2001

(65) Prior Publication Data
US 2002/0035546 A1 Mar. 21, 2002

(30) Foreign Application Priority Data
Sep. 18, 2000 (JP) .............................. 2000-282121

(51) Int. Cl.
G07G 1/12 (2006.01)
G06F 17/60 (2006.01)
(52) U.S. Cl. .................. 705/53; 380/227; 380/228; 380/229; 380/230; 705/1; 705/52
(58) Field of Classification Search .................. 705/33, 705/52, 67, 77, 51, 59, 64, 65, 66, 1, 53; 455/41.1–41.3; 713/185–186; 380/227–230
See application file for complete search history.

(56) References Cited

U.S. PATENT DOCUMENTS

| 4,943,994 A | * | 7/1990 | Ohtsuka et al. ........... 348/14.12 |
| 5,247,575 A | * | 9/1993 | Sprague et al. ................ 705/53 |
| 5,629,980 A | * | 5/1997 | Stefik et al. .................... 705/54 |
| 5,696,894 A | * | 12/1997 | Ono ........................... 358/1.15 |
| 5,737,690 A | * | 4/1998 | Gutman ..................... 340/7.54 |
| 6,105,010 A | * | 8/2000 | Musgrave ..................... 705/44 |
| 6,763,336 B1 | * | 7/2004 | Kolls ........................... 705/44 |
| 6,789,113 B1 | * | 9/2004 | Tanaka ........................ 709/223 |
| 2002/0015185 A1 | * | 2/2002 | Onishi et al. ............... 358/1.16 |

FOREIGN PATENT DOCUMENTS

| JP | 11-355498 | | 12/1999 |
| JP | 2000-200247 | | 7/2000 |
| JP | 2001125758 A | * | 5/2001 |
| WO | WO 01/42894 A1 | * | 6/2001 |

OTHER PUBLICATIONS

Paymentone.Com © 2007 "Content and Third Party Billing Services That Reduce Churn and Increase ARPU" Retrived online Apr. 19, 2010.*

"Who is the winner in competition for the title as Standard Device of Post-PC area?" Top player of Network Terminals decided Akiko Inage, Nikkei Trendy, Nikkei Home Press, Japan, Jul. 25, 2000. No. 169. pp. 12-15.

* cited by examiner

*Primary Examiner*—James A Reagan
(74) *Attorney, Agent, or Firm*—Oblon, Spivak, McClelland, Maier & Neustadt, L.L.P.

(57) ABSTRACT

A cellular phone company closes a contract with a user to the effect that the cellular phone company collects a predetermined basic charge from the user together with a communication charge. When the user intends to print out a contents, the user sends authentication information given to him/her to a contents server from his/her cellular phone. The contents server authenticates the user based on the authentication information, and sends contents data for browsing to the user's cellular phone, if authentication is successful. The user's cellular phone sends print request information to a printer. The printer acquires corresponding contents data for print-out from the contents server in accordance with the print request information, and prints out the contents. The cellular phone company collects the basic charge and the communication charge from the user based on the contract.

19 Claims, 6 Drawing Sheets

PRINTING SYSTEM USING A PORTABLE TERMINAL AND PRINTING CHARGE COLLECTING METHOD

BACKGROUND OF THE INVENTION

1. Field of the Invention

The present invention relates to a printing charge collecting method employed in a printing system using a portable terminal. More particularly, the present invention relates to a method for collecting a printing charge required for printing out data in a printing system in which the data which has been retrieved using a portable terminal, such as a cellular phone, can be printed out by a printer.

2. Description of the Related Art

Portable terminals are now rapidly spreading. The most typical one is the cellular phone. And recently, uses of those portable terminals on the Internet have been developing. For example, with the use of a cellular phone, communications can be e-mailed from anywhere in real time. Information on the Internet can directly be searched, or data can be acquired by executing a function of a Web browser. Further, applications for gateway services are provided. Some of those gateway services include: a banking service in which one can check his/her balance in his/her bank account, or can transfer money to his/her account; a ticket service in which one can reserve a ticket without going to a ticket agency; and a service in which one can sell or buy financial products such as stocks, investment funds, and the like.

Another service available using a portable terminal such as a cellular phone and the like is distribution of contents. For example, NTT DoCoMo Inc. provides an -I-MODE cellular internet service which is a service for getting a user connected to a network such as the Internet from a cellular phone. In the -I-MODE cellular internet service, the cellular phone telecommunication network of NTT DoCoMo Inc. acts as a provider. In order to browse contents of official sites authenticated by NTT DoCoMo Inc., it is required to access the contents server (gateway server) operated by NTT DoCoMo Inc. from cellular phones corresponding to the -I-MODE cellular internet service, and to get authenticated. Charges for utilizing official charge-requiring contents are collected from users by, for example, NTT DoCoMo Inc. on behalf of contents providers, together with the communication charges. NTT DoCoMo Inc. subtracts predetermined commissions from the collected charges, and pays the remainder to contents providers.

While functions of portable terminals are becoming advanced and varied as described above, various demands are arising. For example, users request a larger display of contents which users browse using their portable terminals, request to keep contents at hand as hard copies, or request to print out contents on the spot as materials for presentation at business negotiations or materials to be provided to customers.

Most of the convenience stores and offices have now introduced digital copying machines that can act as a MFP (Multi Function Peripheral). Those copying machines usually have a printing function which works in accordance with a print request from PCs or other devices. Those copying machines are often connected to a network and shared on an Intranet/the Internet. Thus, a printing system, for connecting a portable terminal to such a MFP to print out data such as contents, is proposed. In this case, the MFP is to be installed in, for example, a convenience store or an office.

In such a printing system, a printing apparatus such as a copying machine receives a URL (Uniform Resource Locator) which specifies the site of the contents selected by a user, from a portable terminal. Then, the printing apparatus accesses a contents server using this URL, acquires data having high resolution from the contents server, and prints out the data As a result, the user obtains the information which is printed out on a sheet of paper.

As described above, such a printing system is very useful, and can be used by users easily though having high-level functions. Because of this, businesses using such a printing system have potential to expand a great deal. In such a printing system, printing function providers install software in their printing apparatuses to provide such a function to users. Those printing function providers earn profits by collecting printing charges from users. However, there has been no established method for collecting printing charges in such a printing system.

SUMMARY OF THE INVENTION

The present invention was contrived in view of the above-described circumstance, and it is an object of the present invention to provide a system and a method for collecting a printing charge from a user of a printing system in which a printer acquires and prints out data for print-out in accordance with print request information sent from a portable terminal.

To accomplish the above object, the printing charge collecting method according to a first aspect of the present invention is a method which is applicable to a printing system comprising: a portable terminal; a printing apparatus which is capable of communicating data with the portable terminal and is connected to a network; and a contents server which is capable of communicating data with the printing apparatus via the network, wherein: in a case where a user intends to print out contents data of the contents server which the user browses using the portable terminal, the user sends print request information for requesting print-out of the contents data to the printing apparatus; and the printing apparatus connects to the contents server via the network in accordance with the print request information, and acquires and prints out corresponding contents data for print-out, the printing charge collecting method comprising the steps of:

permitting a user to download contents data for browsing or printing purposes by authenticating authentication information which is given to the user who in advance has closed a contract with a company managing the portable terminal;

collecting a predetermined basic charge from the user based on the contract together with a communication charge; and paying an amount derived by subtracting a predetermined commission from the basic charge to a provider of a printing function of the printing system.

The printing charge collecting method may comprise the steps of;

sending information for requesting acquisition of the user's desired contents data, and the user's ID information and password information to the contents server from the portable terminal, when the user intends to browse the contents data of the contents server using the portable terminal;

authenticating the user based on the information which the contents server receives from the portable terminal, searching for the user's desired contents data in a case where authentication is successful, and sending the located contents data to the portable terminal from the contents server;

displaying the contents data which the portable terminal receives from the contents server on a screen of the portable terminal;

sending the print request information from the portable terminal to the printing apparatus, if the user determines to print out the contents data after determination whether or not to print out the contents data by checking the screen on which the contents data is displayed;

sending information for requesting acquisition of contents data for print-out, and the user's ID and password to the contents server from the printing apparatus in accordance with the print request information which the printing apparatus receives;

authenticating the user again upon reception by the contents server of the information for requesting acquisition of the contents data for print-out, and the user's ID and password, searching for the contents data for print-out in a case where authentication is successful, and sending the contents data for print-out to the printing apparatus from the contents server; and printing the contents data for print-out which the printing apparatus receives.

The predetermined commission may be 9% of the basic charge.

The printing charge collecting method may comprise the steps of:

sending information for requesting acquisition of the user's desired contents data, and the user's ID information and password information to the contents server from the portable terminal, when the user intends to browse the contents data of the contents server using the portable terminal;

authenticating the user based on the information which the contents server receives from the portable terminal, searching for the user's desired contents data in a case where authentication is successful, and sending the located contents data to the portable terminal from the contents server;

displaying the contents data which the portable terminal receives from the contents server on a screen of the portable terminal;

sending the print request information from the portable terminal to the printing apparatus, if the user determines to print out the contents data after determination whether or not to print out the contents data by checking the screen on which the contents data is displayed;

sending information for requesting acquisition of contents data for print-out to the contents server from the printing apparatus in accordance with the print request information which the printing apparatus receives;

searching for the contents data for print-out upon reception by the contents server of the information for requesting acquisition of the contents data for print-out, and sending the contents data for print-out to the printing apparatus from the contents server; and printing the contents data for print-out which the printing apparatus receives.

The printing charge collecting method according to a second aspect of the present invention is a method which is for collecting a charge for printing out contents in a printing system which comprises: a portable terminal; a contents server for storing contents data for browsing and contents data for print-out both representing a contents; and a printer having a printing function for printing out the contents represented by the contents data for print-out, when acquiring the contents data for print-out from the contents server in accordance with print request information which the printer receives and is for requesting print-out of the contents data for print-out, the printing charge collecting method comprising the steps of:

sending from the portable terminal to the contents server, authentication information which is given to a user who has closed a contract with a portable terminal service provider who provides a service of the portable terminal to the effect that the user must pay a predetermined basic charge including a payment to a printing function provider who provides the printing function together with a communication charge;

sending the print request information from the portable terminal to the printer in accordance with an operation of an operator, in a case where the contents server sends the contents data for browsing to the portable terminal;

authenticating the user based on the authentication information, and sending the contents data for browsing to the portable terminal from the contents server, in a case where authentication is successful; and collecting the basic charge together with the communication charge from the user based on the contract.

The authentication information may include ID information and password information which are given to the user, and information for specifying the contents data for browsing.

An amount obtained by subtracting a predetermined commission from the basic charge collected from the user may be paid from the portable terminal service provider to the printing function provider.

The contents data for browsing may comprise the contents data for print-out.

The printer may carry out the printing function by executing a program loaded therein, and the printing function provider may provide the printing function by loading the program into the printer.

The portable terminal service provider may close a contract with the user to the effect that the user must pay a predetermined additional charge each time the contents is printed out on a recording material, besides the basic charge.

In this case, the portable terminal service provider may collect the additional charge from the user based on the contract, besides the basic charge, each time the portable terminal sends the print request information to the printer, and may pay the additional charge to the printing function provider.

The portable terminal may store electronic money comprising data representing a monetary value, and the user may pay the additional charge to the portable terminal service provider by sending some electronic money corresponding to the additional charge to the portable terminal service provider.

A space provider who provides a space where the printer is to be installed may close a contract with the user to the effect that the user must pay a predetermined additional charge each time the contents is printed out on a recording material.

In this case, the space provider may collect the additional charge from the user based on the contract each time the contents is printed out on a recording material by the printer, and may pay the additional charge to the printing function provider.

The space provider may pay a portion of the collected additional charge to a provider of the printer.

The printing system according to a third aspect of the present invention comprises: a portable terminal; a contents server for storing contents data for browsing and contents data for print-out both representing a contents; and a printer, wherein:

the printer has a printing function for printing out the contents represented by the contents data for print-out, when acquiring the contents data for print-out from the contents server in accordance with print request information which the printer receives and is for requesting print-out of the contents data for print-out;

the portable terminal sends to the contents server, authentication information which is given to a user who has closed a contract with a portable terminal service provider who provides a service of the portable terminal to the effect that the user must pay a predetermined basic charge including a payment to a printing function provider who provides the printing function together with a communication charge, and sends the print request information to the printer in accordance with an operation of an operator, in a case where the contents server sends the contents data for browsing to the portable terminal; and the contents server authenticates the user based on the authentication information, and sends the contents data for browsing to the portable terminal, in a case where authentication is successful.

Upon receiving the contents data for browsing, the portable terminal may display the contents data for browsing.

The authentication information may include ID information and password information which are given to the user, and information for specifying the contents data for browsing.

The contents server according to a fourth aspect of the present invention comprises:

a memory for storing contents data for browsing and contents data for print-out both representing a contents;

a control circuit for authenticating a user based on authentication information when supplied from a portable terminal with the authentication information which is given to a user who has closed a contract with a provider of a service of the portable terminal to the effect that the user must pay a predetermined basic charge including a payment to a provider of a printing function together with a communication charge, and for supplying the contents data for browsing to the portable terminal when authentication is successful; and a control circuit for supplying the contents data for print-out to a printer in accordance with a request for supply of the contents data for print-out, when receiving the request from the printer.

The portable terminal may display the contents data for browsing, when receiving the contents data for browsing.

The authentication information may include ID information and password information which are given to the user, and information for specifying the contents data for browsing.

The computer data signal embedded in a carrier wave according to a fifth aspect of the present invention represents a program for controlling a computer to function as:

a memory for storing contents data for browsing and contents data for print-out both representing a contents;

a control circuit for authenticating a user based on authentication information when supplied from a portable terminal with the authentication information which is given to a user who has closed a contract with a provider of a service of the portable terminal to the effect that the user must pay a predetermined basic charge including a payment to a provider of a printing function together with a communication charge, and for supplying the contents data for browsing to the portable terminal when authentication is successful; and a control circuit for supplying the contents data for print-out to a printer in accordance with a request for supply of the contents data for print-out, when receiving the request from the printer.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An embodiment of the present invention will now be explained below with reference to the drawings.

Figure 1:
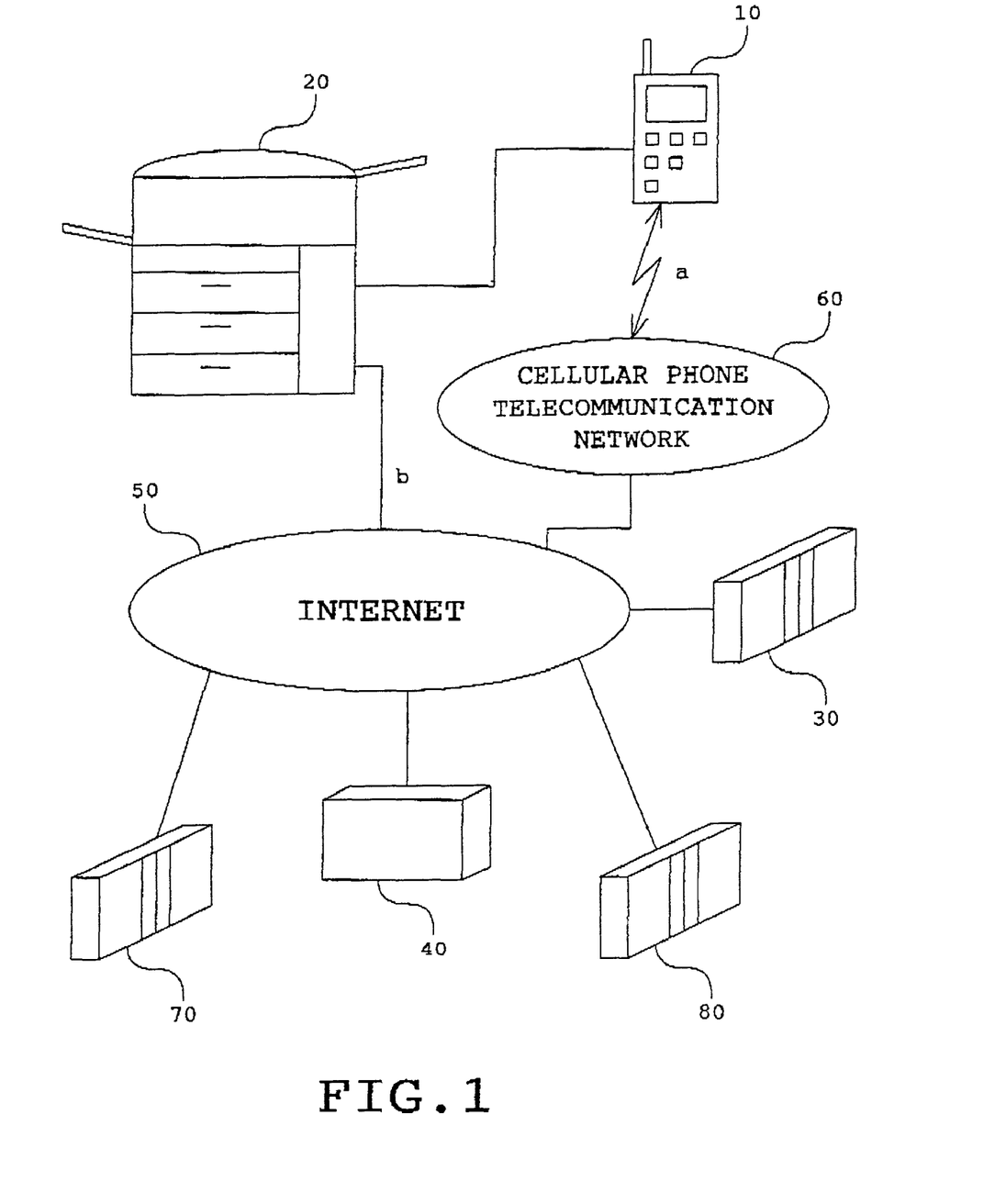
FIG. 1 is a diagram for explaining an example of a structure of a printing system according to an embodiment of the present invention.

FIG. 1 is a diagram for explaining the structure of the printing system according to this embodiment of the present invention.

In FIG. 1, a numeral 10 denotes a cellular phone, a numeral 20 denotes a MFP (Multi Function Peripheral) printer (printing apparatus), a numeral 30 denotes a contents server (or a gateway server), a numeral 40 denotes a contents provider, a numeral 50 denotes the Internet, a numeral 60 denotes a cellular phone telecommunication network, a numeral 70 denotes a server operated by a cellular phone company, and a numeral 80 denotes a server operated by a financial institution.

The cellular phone 10 functions as a terminal such as a portable phone, a PHS (Personal Handyphone System), or a GSM (Global System for Mobile communication). The cellular phone 10 comprises a portable structure, and is connected to the cellular phone telecommunication network 60. The cellular phone 10 has its own phone number.

Figure 2:
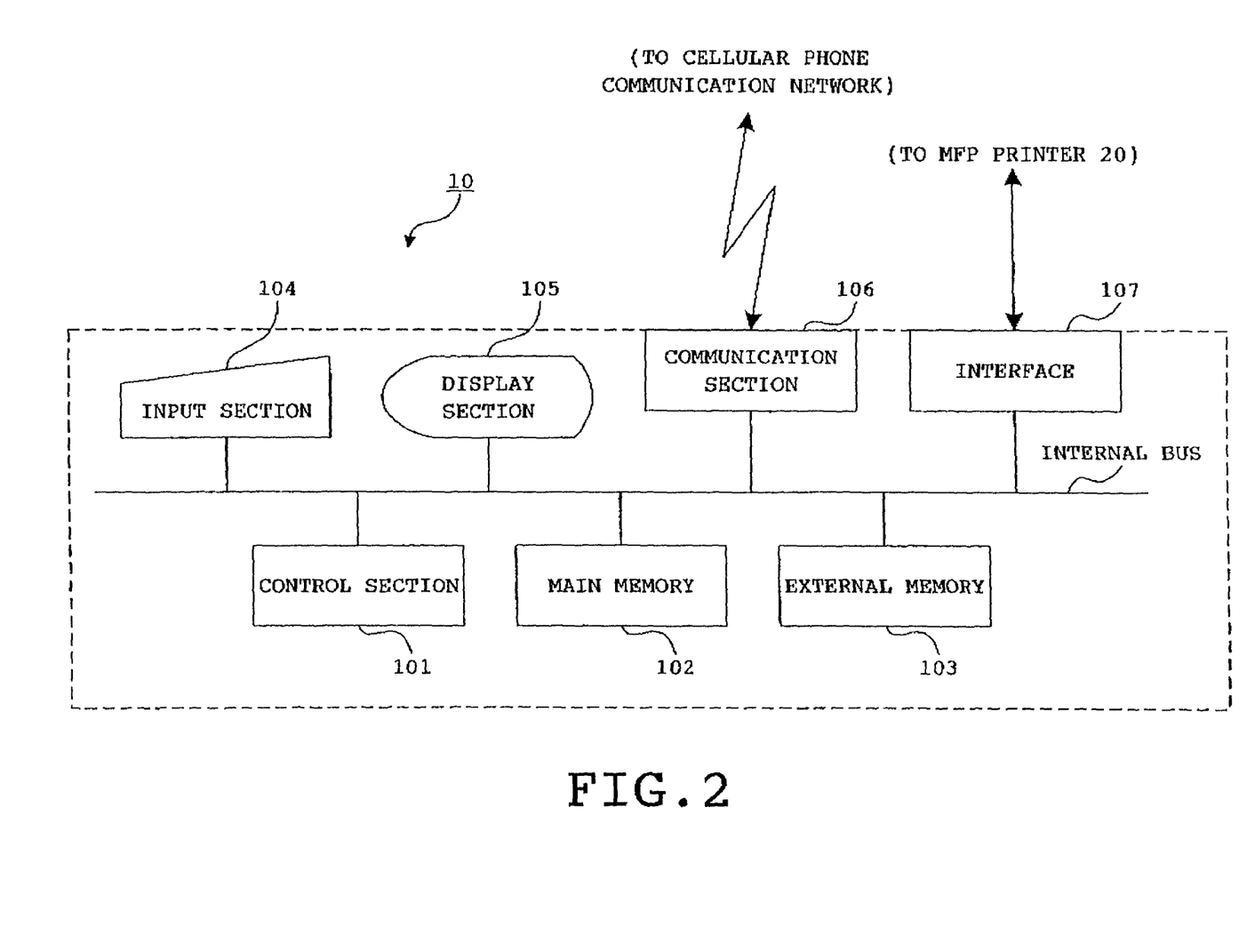
FIG. 2 is a diagram for explaining an example of a structure of a cellular phone.

As shown in FIG. 2, the cellular phone 10 comprises a control section 101, a main memory 102, an external memory 103, an input section 104, a display section 105, communication section 106, and an interface 107. The main memory 102, the external memory 103, the input section 104, the display section 105, the communication section 106, and the interface 107 are connected to the control section 101 via an internal bus.

The control section 101 comprises a CPU (Central Processing Unit). The control section 101 executes an operation described later in accordance with a program stored in the external memory 103.

The main memory 102 comprises a volatile storage such as a RAM (Random Access Memory) or the like. The storage area of the main memory 102 is used as the work area of the control section 101.

The external memory 103 comprises a nonvolatile storage such as an EEPROM (Electrically Erasable/Programmable Read Only Memory) or the like. The external memory 103 pre-stores a program, and an ID and a password which are given to a user of the cellular phone 10. The program stored in the external memory 103 is for controlling the control section 101 to execute an operation described later. The external memory 103 supplies the program, and the ID and password stored therein to the control section 101 in accordance with an instruction given by the control section 101.

The input section 104 comprises a button switch or the like. The input section 104 supplies information following an operation of an operator to the control section 101.

The display section 105 comprises an LCD (Liquid Crystal Display) or the like. The display section 105 displays an image following an instruction given by the control section 101 on a display screen thereof.

The communication section 106 comprises a radio transmitter, a radio receiver, or the like. The communication section 106 transmits information supplied from the control section 101 to the cellular phone telecommunication network 60 by radio. The communication section 106 receives information addressed to the cellular phone 10 from the cellular phone telecommunication network 60 and supplies the received information to the control section 101.

The cellular phone telecommunication network 60 comprises a packet network connected to the Internet 50. The packet network provides, for example, an -I-MODE cellular internet service of NTT DoCoMo Inc.

The packet network performs a DNS (Domain Name Service) operation when receiving information including a URL (Uniform Resource Locator) from the communication section 106 of the cellular phone 10. Specifically, the packet network specifies a server represented by this URL, and sends the information which it receives from the cellular phone 10 to this server via the Internet 50. And when receiving information including the URL of the cellular phone 10 via the Internet 50, the packet network sends the information to the cellular phone 10.

The interface 107 comprises, for example, an USB (Universal Serial Bus) interface. The interface 107 is so structured as to be attachable to a portable terminal interface 205 (described later) of the MFP printer 20.

Let it be assumed that the interface 107 is connected to the portable terminal interface 205. In this case, the interface 107 sends information supplied from the control section 101 to the printer 20 in accordance with an instruction given by the control section 101. And the interface 107 receives information sent from the MFP printer 20, and supplies the information to the control section 101.

Figure 3:
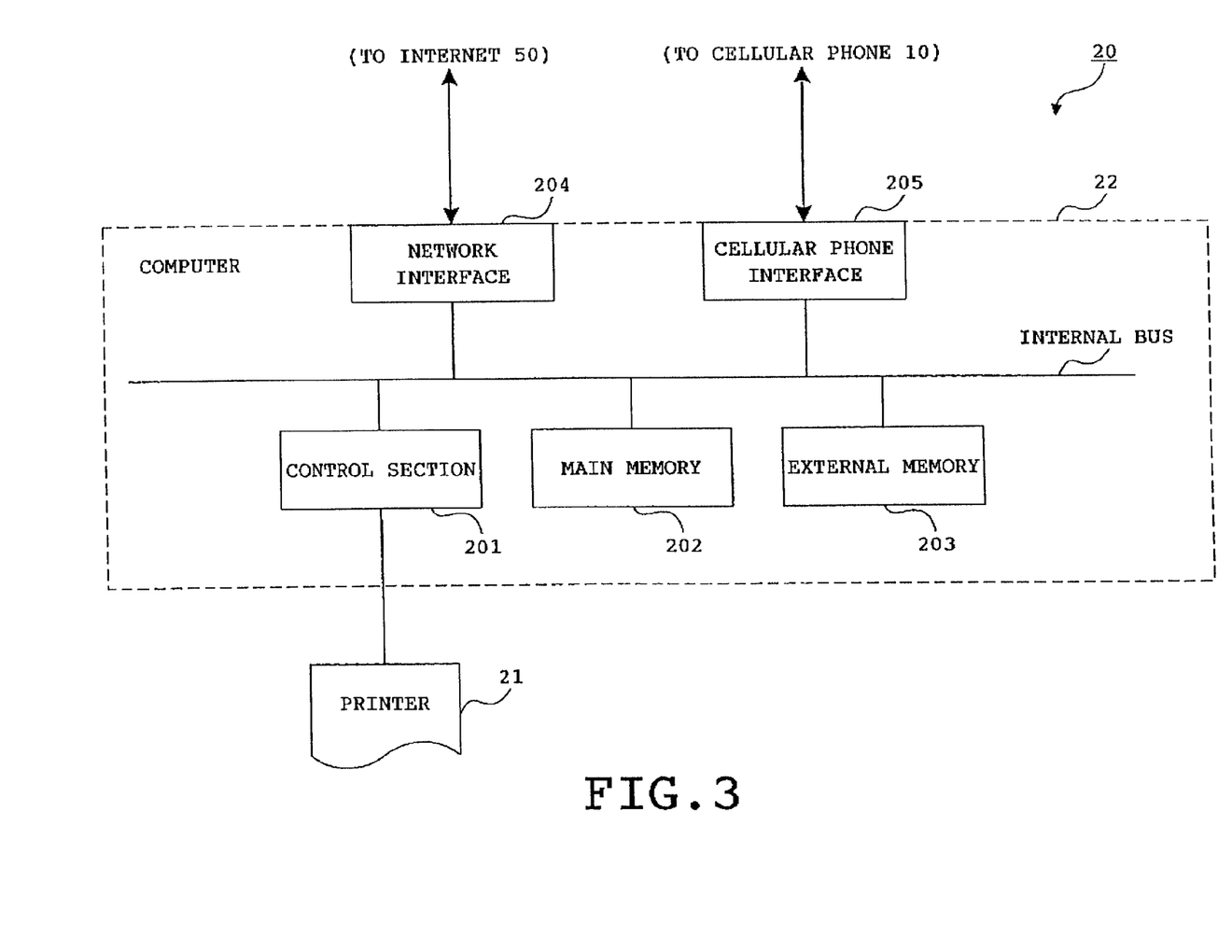
FIG. 3 is a diagram for explaining an example of a structure of a MFP printer.

The MFP printer 20 and the cellular phone 10 may be connected with each other by using cables, or by radio. In case of by radio, the interface 107 and the portable terminal interface 205 may, for example, comprise short-range radio-communication devices based on the Bluetooth standards. However, the communication method is not limited to this example.

As shown in FIG. 3, the MFP printer (printing apparatus) 20 comprises a printer 21 and a computer 22. The printer 21 and the computer 22 are connected with each other.

The printer 21 prints out data under the control of the computer 22.

The computer 22 comprises, for example, a control section 201, a main memory 202, an external memory 203, a network interface 204, and a portable terminal interface 205. The main memory 202, the external memory 203, the network interface 204, and the portable terminal interface 205 are connected to the control section 201 via an internal bus. The printer 21 is connected to the control section 201.

The control section 201 comprises a CPU and a printer interface circuit. The control section 201 performs operations described later such as controlling the printer 21 to print data, in accordance with a program stored in the external memory 203.

The main memory 202 comprises a volatile storage such as a RAM or the like. The storage area of the main memory 202 is used as the work area of the control section 201.

The external memory 203 comprises a nonvolatile storage such as a hard disk device or the like. The external memory 203 stores a program for controlling the control section 201 to execute an operation described later. The external memory 203 supplies data stored therein to the control section 201 in accordance with an instruction given by the control section 201.

The network interface 204 comprises, for example, a DSU (Data Service unit). The network interface 204 is connected to the Internet 50.

The network interface 204 sends information supplied from the control section 201 to the contents server 30 via the Internet 50 in accordance with an instruction given by the control section 201.

The network interface 204 receives information addressed to the MFP printer 20 from the Internet 50, and supplies the information to the control section 201. In a case where the information addressed to the MFP printer 20 is a program, the MEP printer 20 loads this program. That is, the network interface 204 supplies this program to the control section 201, and the control section 201 stores this program in the external memory 203. By execution of this loaded program by the control section 201, the MFP printer 20 performs an operation described later.

The MFP printer 20 and the Internet 50 may be connected with each other by using cables, or by radio. In case of by radio, the network interface 204 may, for example, comprise a wireless LAN (Local Area Network) However, the connection method is not limited to this example.

Instead of loading a program via a network, the MFP printer 20 may load the program by reading the program from a recording medium such as a CD-ROM, a flexible disk, or the like. However, in this case, the MFP printer 20 should comprise a recording medium driver for reading data from the recording medium, instead of the network interface 204.

The portable terminal interface 205 comprises, for example, a USB interface. The portable terminal interface 205 is so structured as to be attachable to the interface 107 of the cellular phone 10.

Let it be assumed that the portable terminal interface 205 is connected to the interface 107. In this case, the portable terminal interface 205 sends information supplied from the control section 201 to the cellular phone 10 in accordance with ad instruction given by the control section 201. And the portable terminal interface 205 receives information sent from the cellular phone 10, and supplies the information to the control section 201.

The contents server 30 comprises a server computer. Specifically, the contents server 30 comprises, for example, a structure shown in FIG. 4. That is, the contents server 30 comprises, for example, a control section 301, a main memory 302, an external memory 303, and an interface 304.

Figure 4:
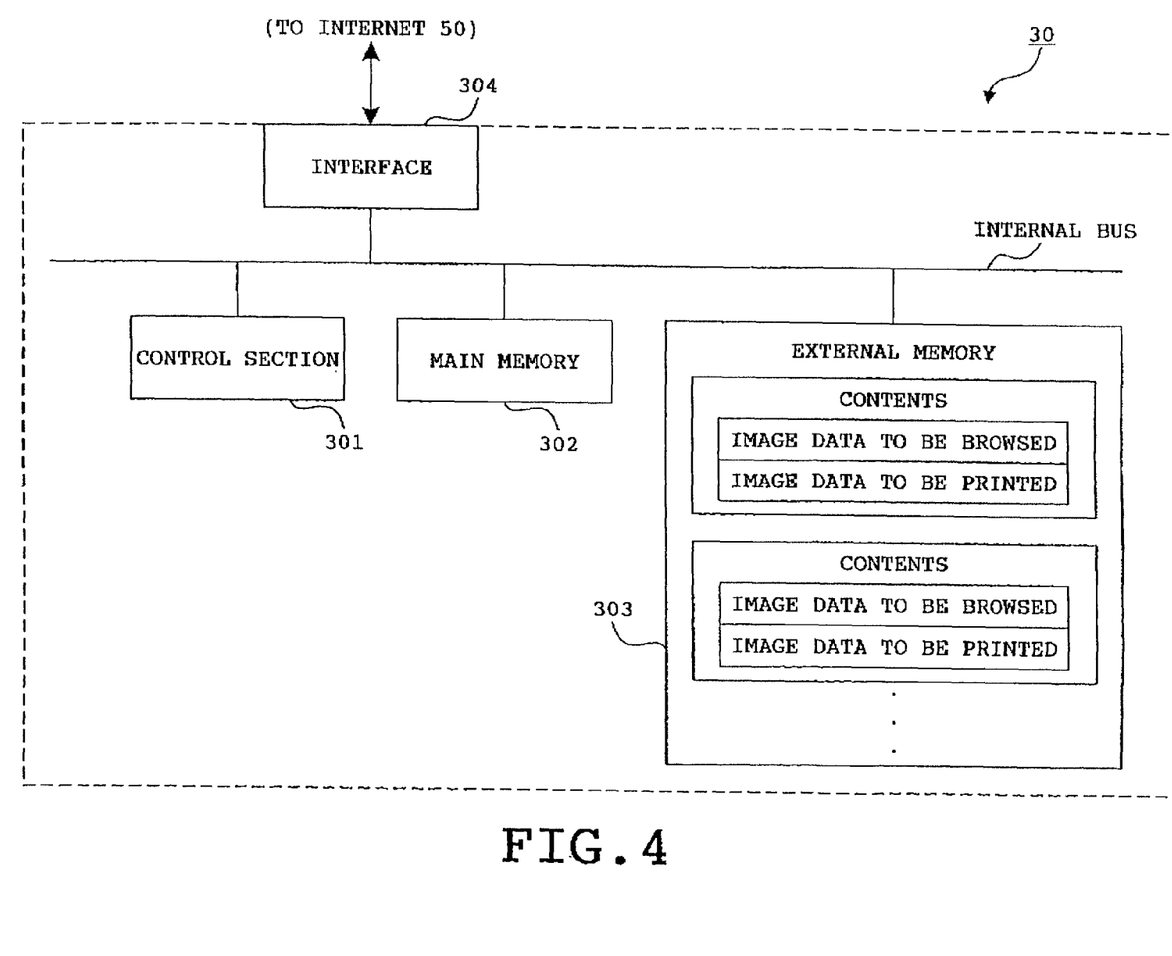
FIG. 4 is a diagram for explaining an example of a structure of contents server.

The main memory 302, the external memory 303, and the interface 304 are connected to the control section 301 via an internal bus.

The control section 301 comprises a CPU. The control section 301 executes an operation described later in accordance with a program stored in the external memory 303.

The main memory 302 comprises a volatile storage such as a RAM or the like. The storage area of the main memory 302 is used as the work area of the control section 301.

The external memory 303 comprises a nonvolatile storage such as a hard disk device or the like. The external memory 303 stores a program and contents. The program is for controlling the control section 301 to execute an operation described later. The contents include image data. The external memory 303 supplies data stored therein to the control section 301 in accordance with an instruction given by the control section 301.

Each of the contents stored in the external memory 303 includes image data to be browsed using an -I-MODE cellular internet cellular phone, and image data to be printed out by the MFP printer 20, as shown in FIG. 4. A URL is given to each of the image data to be browsed using an -I-MODE cellular internet cellular phone, and the image data to be printed out by the MFP printer 20. However, those two kinds of image data may be the same. In this case, the single image data may have either one URL or two URLs.

The interface 304 comprises a communication control device such as a DSU. The interface 304 is connected to the Internet 50.

The interface 304 sends information supplied from the control section 301 to the cellular phone 10 via the Internet 50 and the packet network in accordance with an instruction given by the control section 301. The interface 304 receives information addressed to the contents server 30 from the internet 50, and supplies the information to the control section 301.

The contents provider 40 comprises a server computer. Specifically, the contents provider 40 comprises, for example, a structure shown in FIG. 5. That is, the contents provider 40 comprises, for example, a control section 401, a main memory 402, an external memory 403, an interface 404, and an input section 405.

Figure 5:
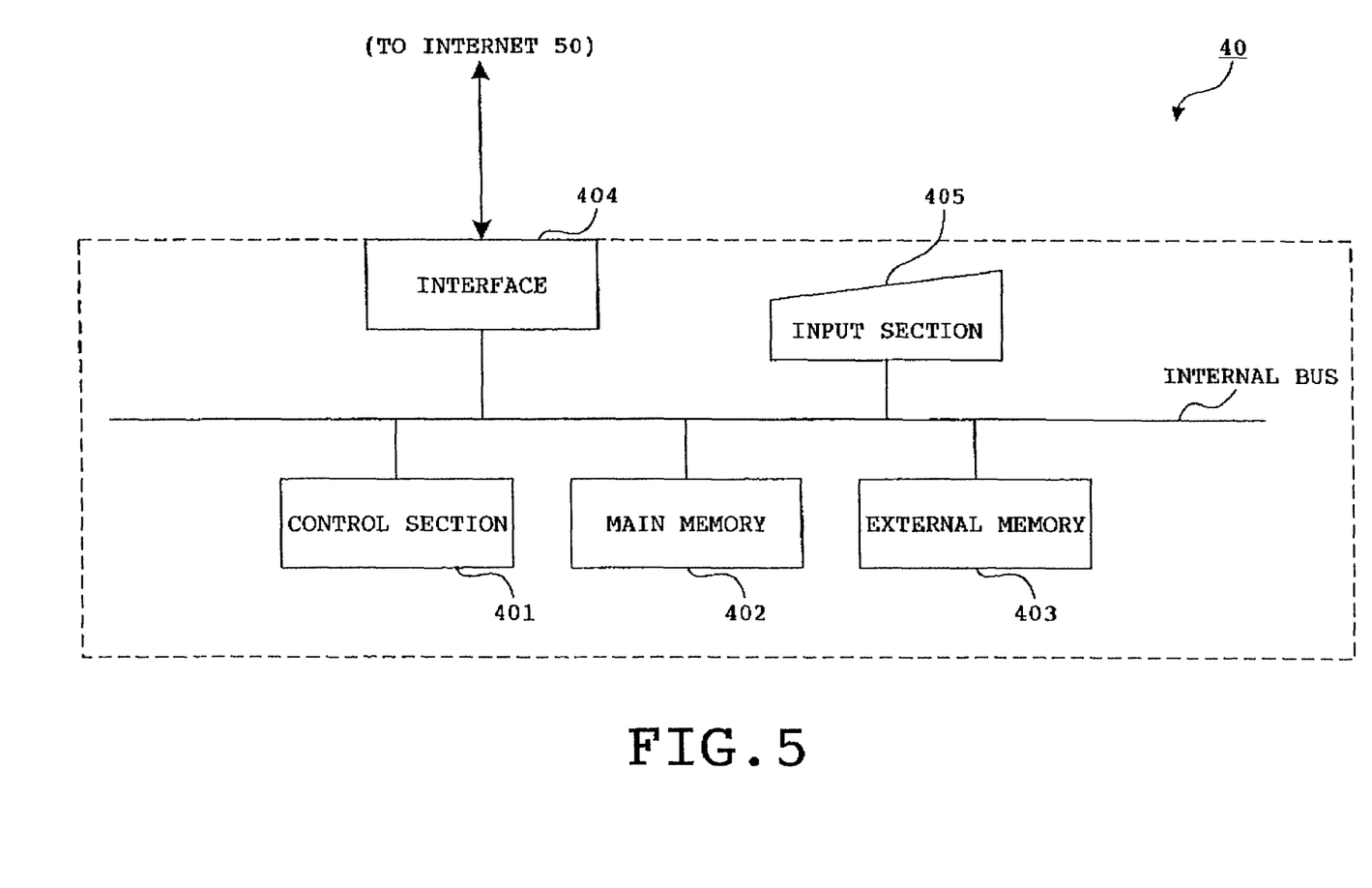
FIG. 5 is a diagram for explaining an example of a structure of a contents provider.

The main memory 402, the external memory 403, the interface 404, and the input section 405 are connected to the control section 401 via an internal bus.

The control section 401 comprises a CPU. The control section 401 executes an operation described later in accordance with a program stored in the external memory 403. The control section 401 may further execute an operation for producing contents in accordance with a program stored in the external memory 403. The program for controlling the operation for producing contents is, for example, a graphical application.

The main memory 402 comprises a volatile storage such as a RAM or the like. The storage area of the main memory 402 is used as the work area of the control section 401.

The external memory 403 comprises a nonvolatile storage such as a hard disk device or the like. The external memory 403 stores a program for controlling the control section 401 to execute an operation described later, and contents to be supplied to the contents server 30. The external memory 403 supplies data stored therein to the control section 401 in accordance with an instruction given by the control section 401.

The interface 404 comprises a communication control device such as a DSU. The interface 404 is connected to the Internet 50.

The interface 404 sends information supplied from the control section 401 to the contents server 30 via the Internet 50 in accordance with an instruction given by the control section 401.

The input section 405 comprises a keyboard, a mouse, a tablet, and the like. The input section 405 supplies information following an operation of an operator to the control section 401. The input section 405 may comprise a recording medium driver for reading data such as image data from a recording medium.

Figure 6:
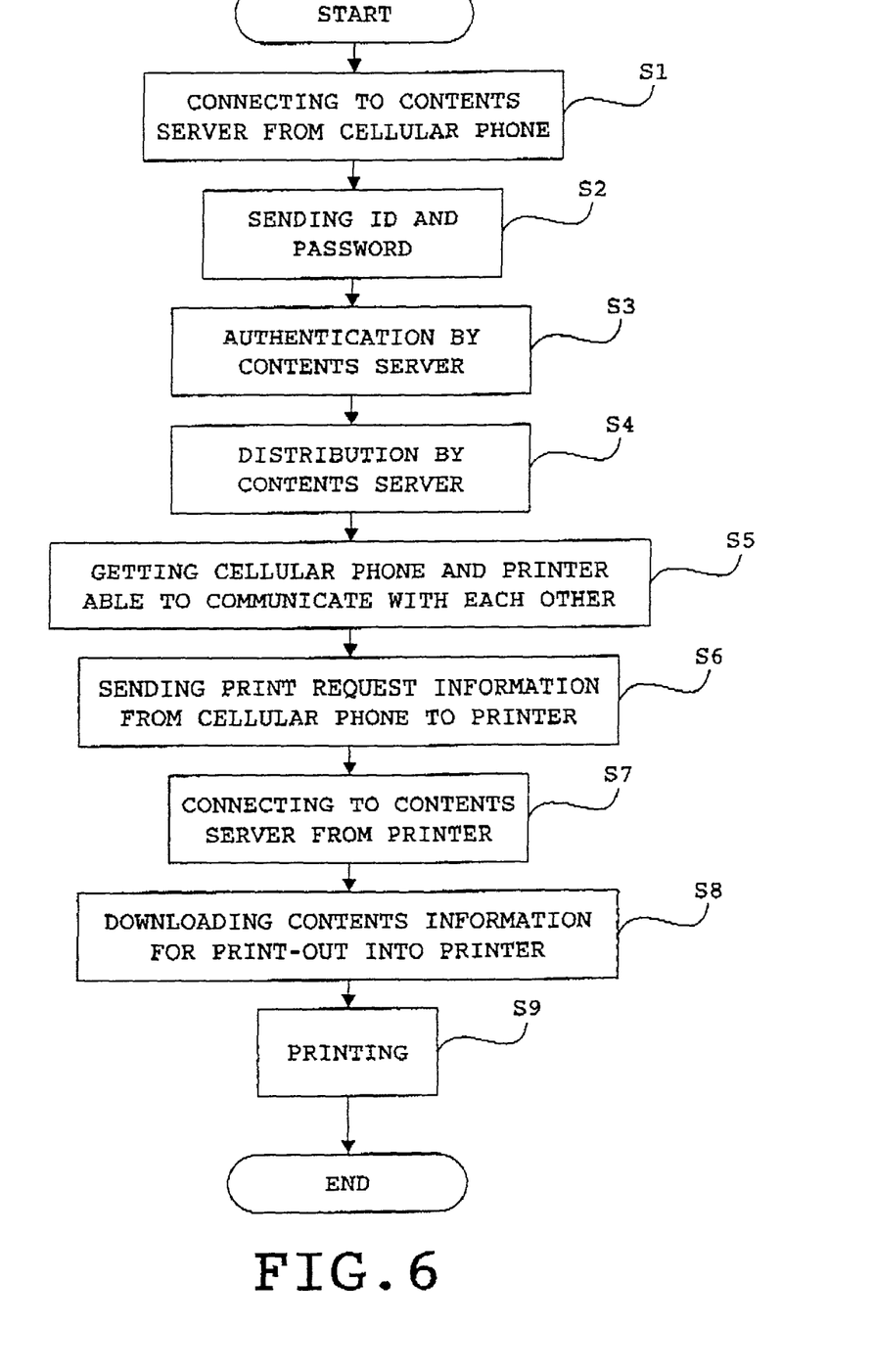
FIG. 6 is a flowchart for explaining an example of a process performed by a printing system according to an embodiment of the present invention.

FIG. 6 is a flowchart for explaining a process executed by this printing system.

As shown in FIG. 6, the cellular phone 10 is connected to the contents server 30 in accordance with an operation of a user (step S1). This connection is performed via the cellular phone telecommunication network 60 and the Internet 50. The user browses the contents stored in the contents server 30 using the cellular phone 10.

The cellular phone 10 has a function for browsing contents data stored in the contents server 30 and downloading the contents data. This function is realized by, for example, the aforementioned cellular phone corresponding to the -I-MODE cellular internet service. In the -I-MODE cellular internet service, the contents to be distributed by the contents server 30 is loaded in an official site authenticated by NTT DoCoMo Inc. Contents data stored in the contents server 30 is produced by, for example, the contents provider 40. The produced contents data is transferred to the contents server 30 after authenticated by NTT DoCoMo Inc.

If an official site is a charge-requiring site, users are required to subscribe to the official site in advance, in order to access this official site using the cellular phone 10 and browse the contents. When users subscribe to an official site, an information charge is set for them. Information charges may be freely set by contents providers providing official sites. A typical information charge is several dollars per month. In a case where the cellular phone 10 accesses an official charge-requiring site using the -I-MODE cellular internet function, the contents server 30 authenticates the cellular phone 10 with regard to data downloading. That is, before the cellular phone 10 downloads data from a charge-requiring official site, the contents server 30 authenticates an ID and a password sent from the cellular phone 10.

Upon accessing the contents server 30, the cellular phone 10 calls a site including the user's desired contents that is provided for cellular phones. Then, the cellular phone 10 sends the user's ID and password to be authenticated (steps S2 and S3). After performing authentication, the contents server 30 searches for the contents requested by the cellular phone 10, and distributes the contents to the cellular phone 10 (step S4). in step S4, the contents is distributed via the cellular phone telecommunication network 60 of the cellular phone company and via a route "a" shown in FIG. 1.

Upon receiving the contents, the cellular phone 10 displays the contents on the display screen thereof. The user browses the contents while looking at the display screen. If the user finds something on the display that he/she wants to print out, the user gets the cellular phone 10 in an interface where the cellular phone 10 can communicate with the MFP printer 20 (step S5). Specifically, for example, the user brings the cellular phone 10 to a place where the MFP printer 20 is installed (for example, a convenience store), and connects the cellular phone 10 to the MFP printer 20. In a case where the cellular phone 10 and the MFP printer 20 can communicate with each other by radio, the user moves to an area where the MFP printer 20 and the cellular phone 10 can communicate. Then, the user performs a predetermined operation to the input section 104 of the cellular phone 10 in order to send print request information from the cellular phone 10 to the MFP printer 20 (step S6).

Data included in the contents that can be browsed by -I-MODE cellular internet cellular phones may be the same as data included in the contents that can be browsed by WWW terminals. However, -I-MODE cellular internet cellular phones have many limitations with regard to displaying their contents. For example, some -I-MODE cellular internet cellular phones may have a lower capacity limit than that of WWW terminals for accepting contents. Some -I-MODE cellular internet cellular phones may not be capable of color display. -I-MODE cellular internet cellular phones have smaller screens than those of WWW terminals. Therefore, it is preferable that the contents provider 40 separately produces data for -I-MODE cellular internet contents and data for WWW contents.

The print request information is sent from the cellular phone 10 to the MFP printer 20. The print request information includes URL (Uniform Resource Locator) information. The URL information specifies the contents that the user has located and wants to print out.

Upon reception of the print request information, the MFP printer 20 connects to the Internet 50, and accesses the contents included in a site specified by the URL information, among the contents stored in the contents server 30 (step S7). This site is the one that includes the desired contents of the user. When connecting to this site, the MFP printer 20 downloads contents data for the WWW (contents data for printout). The contents data is downloaded through a route "b" shown in FIG. 1. Then, the downloaded contents data is printed out on a sheet which the user chooses (steps S8 and S9).

This printing system comprises the cellular phone (portable terminal) 10 having the -I-MODE cellular internet function or the like, and capable of browsing contents, the MFP printer 20 connected to a network, and the contents server 30. The cellular phone 10, the MFP printer 20, and the contents server 30 are connected to a public line and/or a private line, and can communicate with one another. Software for realizing the functions of the printing system needs to be installed in the MFP printer 20. The contents provider 40 is required to have a system for distributing WWW contents data which is substantially the same as contents data for cellular phones. Contents data for cellular phones distributed by the contents provider 40 is produced so as to include a menu by which users can instruct this printing system to perform printing operation. Therefore, users can easily give an instruction to carry out printing using the cellular phone 10.

In step 6, the cellular phone 10 may send an ID and a password to the MFP printer 20. In this case, after connecting to the contents server 30 in step S7, the MFP printer 20 may send the ID and password to the contents server 30, just like the cellular phone 10 sends the ID and password in step S2. And in this case, the contents server 30 may perform authentication using the ID and password sent from the MFP printer 20, like it does in step S3, and only in a case where authentication goes well, the contents server 30 may permit the operation in step S8 to be performed.

When staring a business utilizing this printing system, a provider who provides the printing function of this printing system installs software in the MFP printer 20. The provider collects the charge (printing charge) required to use this printing system. For example, a user may pay a predetermined monthly charge to the provider. The provider may give permission to use this printing system to a user who pays this monthly charge. There are many possible methods for collecting the printing charge other than this one. The "printing charge" is defined herein as a charge required in total to use this printing system, including an additional charge (described later) and the monthly charge (basic charge). A method for collecting the additional charge, and a method for collecting the basic charge will be described later in detail.

The printing function provider installs software for controlling the MFP printer 20 to realize the printing function in the MFP printer 20. The software is capable of controlling the MFP printers 20 to execute targeted actions regardless of the manufacturers and models of the MFP printers 20. The MFP printers 20 in which the software is installed are to be placed in convenience stores, DPE service providing shops and the like. That is, the MFP printers 20 may be put in any places that may be convenient for users.

The basic charge required for utilizing this printing system is set at, for example, 1 dollar per month. Users are further required to pay a predetermined additional charge each time they print out data using this printing system. The additional charge is set at, for example, 30 cents per sheet for monochrome printing, and 1 dollar per sheet for color printing. The basic charges are collected from users by a cellular phone company on behalf of the printing function provider. The cellular phone company subtracts predetermined commissions from the collected basic charges, and pays the remainder to the printing function provider. If the printing function provider entrusts the management of their server or the like to a third party, the provider pays to the third party, a predetermined amount from the remainder which the provider receives.

The additional charges are collected in shops in which the MFP printers 20 are installed. Those shops use some of the received additional charges for maintenance of the MFP printers 20 and a performance charge (P/C) to be described later, and pays the remainder to the printing function provider, or to the cellular phone company. There are also many possible methods for collecting the additional charge. For example, the shops may attach a box to the MFP printers 20.

The box may comprise the same structure as that of a box which is attached to a charge-requiring copying machine which provides the copying service when a coin is put into the box. That is, this box may comprise an interface for detecting that the MFP printer 20 has printed out some contents, a slot into which a coin is put, a device for collecting an amount corresponding to the additional charge from the coin which has been inserted, and a device for returning an amount that has not been collected in accordance with a user's operation.

In this case, a user puts enough money into this box. This box collects an amount corresponding to the additional charge from the inserted money, each time the user carries out printing. If any amount is left unused, this box returns the unused amount to the user. The amount that should be returned may be determined by executing software for calculating the total amount of the additional charges. In this case, the amount to be returned is returned to the user after the user finishes printing.

Data representing the total amount of the additional charges calculated by executing the software may be transferred to a cellular phone. In this case, a cellular phone company may collect the amount represented by the data transferred to the cellular phone, together with the basic charge, on behalf of a shop. A cellular phone company, or a shop that has collected the additional charge pays a performance charge (P/C) to, for example, a company that has sold the MFP printer 20. The P/C is set at, for example, 3.5 cents per sheet for monochrome printing, and 25 cents per sheet for color printing.

The method by which a cellular phone company collects a basic charge on behalf of a printing function provider is as follows. The printing function provider requires a charge for the right to use this printing system based on an agreement with a cellular phone company, just as a charge-requiring site requires a charge for its use. For example, to browse the charge-requiring contents on an official site authenticated by NTT DoCoMo Inc. in the -I-MODE cellular internet service, a user close a predetermined contract with NTT DoCoMo Inc. in advance, as described above. Then, NTT DoCoMo Inc. collects from the user, a monthly basic charge for browsing the user's desired charge-requiring site. NTT DoCoMo Inc.

subtracts a predetermined commission from the collected charge, and pays the remainder to a contents provider 40. Just like this, also in case of this printing system, a user and a cellular phone company close a contract, and the user pays a predetermined basic charge (for example, 1 dollar per month) to this cellular phone company based on this contract. Due to this payment, the user can use this printing system from anywhere.

The cellular phone company receives, for example, 9% of the collected monthly basic charge as a commission to collect the charge for the printing function provider's sake, and the printing function provider receives the remainder.

The charge system is not limited to the above. The cellular phone company may collect the amount to be paid to the printing function provider, by separately collecting the basic charge, and charges determined by the number of sheets used. Or, charges may be collected completely by the number of sheets used. In case of employing a charge system requiring charges by the number of sheets used, charges may be calculated based on print request information, with execution of software by the MFP printer 20. Then, the MFP printer 20 may transfer information representing the total amount of charges to the cellular phone company together with a user's ID. The MFP printer 20 may transfer the information representing the total amount of charges to the cellular phone company directly, or via the cellular phone 10.

The cellular phone 10 may store electronic money in advance. The electronic money is data representing a monetary value. In this case, the cellular phone 10 may send some electronic money corresponding to the additional charge to the server 70 operated by the cellular phone company via a network, each time the cellular phone 10 sends print request information to the MFP printer 20. Or, the cellular phone 10 may send some electronic money corresponding to an amount which the printing function provider should receive to the contents provider 40 via a network, each time the cellular phone 10 sends print request information to the MFP printer 20.

The cellular phone 10 may send some electronic money corresponding to an amount which the printing function provider should receive to the MFP printer 20, together with print request information. In this case, the MFP printer 20 may receive the electronic money sent by the cellular phone 10, and transfer some of the received electronic money to the contents provider 40 via a network, and keep the rest of the received electronic money for the P/C, payment to the printing function provider, and the like.

The cellular phone 10 may access the server 80 operated by a financial institution each time it sends print request information, in order to send data for requesting transfer of an amount corresponding to the additional charge from the user's account to the cellular phone company's account. Or, the cellular phone 10 may access the server 80 operated by the financial institution each time it sends print request information, in order to send data for requesting transfer of an amount that the printing function provider should receive from the user's account to the printing function provider's account.

The MFP printer 20 may access the server 70 operated by the cellular phone company each time it receives print request information, in order to notify the server 70 of the reception of the print request information from the cellular phone 10. In accordance with the notification, the server 70 of the cellular phone company may access the server 80 operated by the financial institution in order to send data for requesting withdrawal of an amount corresponding to the additional charge from the user's account and transfer of the amount to the cellular phone company's account.

The server 70 of the cellular phone company 70 may access the server 80 operated by the financial institution in order to determine whether the amount corresponding to the additional charge has been transferred from the user's account to the cellular phone company's account. In case of determining that the amount corresponding to the additional charge is transferred to the cellular phone company's account, the server 70 may send to the server 80, data for requesting transfer of the amount corresponding to the additional charge from the cellular phone company's account to the account of a space provider who provides the space where the MFP printer 20 is installed.

In order to collect the basic charge, the server 70 of the cellular phone company may access the server 80 of the financial institution based on the contract between the user and the cellular phone company to send data for requesting withdrawal of an amount corresponding to the basic charge from the user's account and transfer of the amount to the cellular phone company's account.

The embodiment of the present invention has been explained as above. The printing system of the present invention can be realized not by a dedicated system, but by an ordinary computer system. The printing system which performs the above-described process can be realized by installing a program for performing the above actions of the contents server 30 in a computer which is connectable to a cellular phone and connected to an MFP printer, from a recording medium (a flexible disk, a CD-ROM, and the like) which stores the above program.

The program may be posted on a bulletin board (BBS) in a communication network, and distributed through the communication network. Or, a carrier wave may be modulated by a signal representing this program, and the obtained modulated wave may be transferred through a network. An apparatus which receives this modulated wave may demodulate the modulated wave to restore the program.

The above-described process can be carried out by starting this program, and executing this program under the control of OS, just as executing other application programs.

In a case where OS takes some part of the process, or in a case where OS constitutes a part of a factor of the present invention, a program which does not include such a part may be stored in a recording medium to be installed in a computer. According to the present invention, in this case, too, a program for controlling a computer to execute functions or steps is stored in this recording medium.

As obvious from the above explanation, according to the present invention, in a printing system in which a printing apparatus carries out printing by acquiring print data in accordance with print request information sent from a portable terminal, a system and a method for collecting a printing charge from a user is realized. According to such a system and a method, since a cellular phone company collects a predetermined basic charge from a user on behalf of a printing function provider, it is very convenient for the user. A provider of a printer, a printing function provider, and a cellular phone company can do a profitable business with such a system and a method.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-282121 Filed on Sep. 18, 2000, and including specification, claims, drawings and summary. The disclosure of the above Japanese Patent Application is incorporated herein by reference in its entirety.

What is claimed is:

1. A printing charge collecting method which is applicable to a printing system including a portable terminal; a printing apparatus which is capable of communicating data with said portable terminal and is connected to a network; and a contents server which is capable of communicating data with said printing apparatus via said network, wherein: in a case where a user intends to print out contents data of said contents server which the user browses using said portable terminal, the user sends print request information for requesting print-out of the contents data to said printing apparatus; and said printing apparatus connects to said contents server via said network in accordance with the print request information, and acquires and prints out corresponding contents data for print-out, said printing charge collecting method comprising:

producing a plurality of contents data representing a same contents, each displayable to one of a plurality of portable terminals having various limitations in displaying data;

storing the plurality of contents data in a contents server;

downloading the contents data to the one of a plurality of portable terminals for browsing or printing purposes by authenticating authentication information which is given to the user who in advance has closed a contract with a company managing said portable terminal;

collecting a predetermined basic charge from the user based on the contract together with a communication charge; and paying an amount derived by subtracting a predetermined commission from the basic charge to a provider of a printing function of said printing system, the provider of the printing function of said printing system being a third party from the user and the company managing said portable terminal.

2. The printing charge collecting method according to claim 1, further comprising:

sending information for requesting acquisition of the user's desired contents data, and the user's ID information and password information to said contents server from said portable terminal;

authenticating the user based on the information which said contents server receives from said portable terminal, searching for the user's desired contents data in a case where authentication is successful, and sending the located contents data to said portable terminal from said contents server;

displaying the contents data which said portable terminal receives from said contents server on a screen of said portable terminal;

sending the print request information from said portable terminal to said printing apparatus, if the user determines to print out the contents data after determination whether or not to print out the contents data by checking the screen on which the contents data is displayed;

sending information for requesting acquisition of contents data for print-out, and the user's ID and password to said contents server from said printing apparatus in accordance with the print request information which said printing apparatus receives;

authenticating the user again upon reception by said contents server of the information for requesting acquisition of the contents data for print-out, and the user's ID and password, searching for the contents data for print-out in a case where authentication is successful, and sending the contents data for print-out to said printing apparatus from said contents server; and printing the contents data for print-out which said printing apparatus receives.

3. The printing charge collecting method according to claim 1, wherein the predetermined commission is 9% of the basic charge.

4. The printing charge collecting method according to claim 1, further comprising:

sending information for requesting acquisition of the user's desired contents data, and the user's ID information and password information to said contents server from said portable terminal;

authenticating the user based on the information which said contents server receives from said portable terminal, searching for the user's desired contents data in a case where authentication is successful, and sending the located contents data to said portable terminal from said contents server;

displaying the contents data which said portable terminal receives from said contents server on a screen of said portable terminal;

sending the print request information from said portable terminal to said printing apparatus, if the user determines to print out the contents data after determination whether or not to print out the contents data by checking the screen on which the contents data is displayed;

sending information for requesting acquisition of contents data for print-out to said contents server from said printing apparatus in accordance with the print request information which said printing apparatus receives;

searching for the contents data for print-out upon reception by said contents server of the information for requesting acquisition of the contents data for print-out, and sending the contents data for print-out to said printing apparatus from said contents server; and printing the contents data for print-out which said printing apparatus receives.

5. A printing charge collecting method which is for collecting a charge for printing out contents in a printing system which includes a portable terminal; a contents server for storing contents data for browsing and contents data for print-out both representing a contents; and a printer having a printing function for printing out the contents represented by the contents data for print-out, when acquiring the contents data for print-out from said contents server in accordance with print request information which said printer receives for print-out, said printing charge collecting method comprising:

producing a plurality of contents data representing a same contents, each displayable to one of a plurality of portable terminals having various limitations in displaying data;

storing the plurality of contents data in a contents server;

sending from said portable terminal to said contents server, authentication information which is given to a user who in advance has closed a contract with a portable terminal service provider who provides a service of said portable terminal to the effect that the user must pay a predetermined basic charge including a payment to a printing function provider who provides the printing function together with a communication charge, the printing function provider being a third party from the user and the portable terminal service provider;

sending the print request information from said portable terminal to said printer in accordance with an operation of an operator, in a case where said contents server sends the contents data for browsing to said portable terminal;

authenticating the user based on the authentication information, and sending the contents data for browsing to said portable terminal from said contents server, in a case where authentication is successful; and collecting the basic charge together with the communication charge from the user based on the contract.

6. The printing charge collecting method according to claim 5, wherein the authentication information includes ID information and password information which are given to the user, and information for specifying the contents data for browsing.

7. The printing charge collecting method according to claim 5, wherein an amount obtained by subtracting a predetermined commission from the basic charge collected from the user is paid from the portable terminal service provider to the printing function provider.

8. The printing charge collecting method according to claim 5, wherein the contents data for browsing comprises the contents data for print-out.

9. The printing charge collecting method according to claim 5, wherein:

said printer carries out the printing function by executing a program loaded therein; and the printing function provider provides the printing function by loading the program into said printer.

10. The printing charge collecting method according to claim 5, wherein:

the portable terminal service provider closes a contract with the user to the effect that the user must pay a predetermined additional charge each time the contents is printed out on a recording material, besides the basic charge; and the portable terminal service provider collects the additional charge from the user based on the contract, besides the basic charge, each time said portable terminal sends the print request information to said printer, and pays the additional charge to the printing function provider.

11. The printing charge collecting method according to claim 10, wherein:

said portable terminal stores electronic money comprising data representing a monetary value; and the user pays the additional charge to the portable terminal service provider by sending some electronic money corresponding to the additional charge to the portable terminal service provider.

12. The printing charge collecting method according to claim 5, wherein:

a space provider who provides a space where said printer is to be installed closes a contract with the user to the effect that the user must pay a predetermined additional charge each time the contents is printed out on a recording material; and the space provider collects the additional charge from the user based on the contract each time the contents is printed out on a recording material by said printer, and pays the additional charge to the printing function provider.

13. The printing charge collecting method according to claim 12, wherein the space provider pays a portion of the collected additional charge to a provider of said printer.

14. A printing system including a portable terminal; a contents server for storing contents data for browsing and contents data for print-out both representing a same contents; and a printer, wherein:

said contents server stores a plurality of the contents data and each contents data is displayable to one of a plurality of portable terminals having various limitations in displaying data;

said printer has a printing function for printing out the contents represented by the contents data for print-out, when acquiring the contents data for print-out from said contents server in accordance with print request information which said printer receives and is for requesting print-out of the contents data for print-out;

said portable terminal sends to said contents server, authentication information which is given to a user who in advance has closed a contract in advance with a portable terminal service provider who provides a service of said portable terminal to the effect that the user must pay a predetermined basic charge including a payment to a printing function provider who provides the printing function together with a communication charge, and sends the print request information to said printer in accordance with an operation of an operator, in a case where said contents server sends the contents data for browsing to said portable terminal, the printing function provider being a third party from the user and the portable terminal service provider; and said contents server authenticates the user based on the authentication information, and sends the contents data for browsing to said portable terminal, in a case where authentication is successful.

15. The printing system according to claim 14, wherein upon receiving the contents data for browsing, said portable terminal displays the contents data for browsing.

16. The printing system according to claim 14, wherein the authentication information includes ID information and password information which are given to the user, and information for specifying the contents data for browsing.

17. A contents server comprising:

a memory for storing contents data for browsing and contents data for print-out both representing a same contents, wherein said memory stores a plurality of the contents data for browsing, each of which is displayable to one of a plurality of the portable terminals having various limitations in displaying data;

a control circuit for authenticating a user based on authentication information when supplied from a portable terminal with the authentication information which is given to a user who in advance has closed a contract with a provider of a service of said portable terminal to the effect that the user must pay a predetermined basic charge including a payment to a provider of a printing function together with a communication charge, and for supplying the contents data for browsing to said portable terminal when authentication is successful, the provider of the printing function of said printing system being a third party from the user and the company managing said portable terminal; and a control circuit for supplying the contents data for print-out to a printer in accordance with a request for supply of the contents data for print-out, when receiving the request from said printer.

18. The contents server according to claim 17, wherein said portable terminal displays the contents data for browsing, when receiving the contents data for browsing.

19. The contents server according to claim 17, wherein the authentication information includes ID information and password information which are given to the user, and information for specifying the contents data for browsing.

* * * * *